United States Patent
Brownell (10) Patent No.: US 9,085,126 B2
(45) Date of Patent: Jul. 21, 2015

(54) METHOD AND APPARATUS FOR NON-CONTACT JOINING OF WEB FED MATERIALS

(75) Inventor: Randal L. Brownell, Fishers, IN (US)

(73) Assignee: BCW DIVERSIFIED, Inc., Anderson, IN (US)

( * ) Notice: Subject to any disclaimer, the term of this patent is extended or adjusted under 35 U.S.C. 154(b) by 278 days.

(21) Appl. No.: 13/399,731

(22) Filed: Feb. 17, 2012

(65) Prior Publication Data

US 2012/0211154 A1    Aug. 23, 2012

Related U.S. Application Data

(60) Provisional application No. 61/444,197, filed on Feb. 18, 2011.

(51) Int. Cl.

| | |
|---|---|
| B32B 39/00 | (2006.01) |
| B29C 65/16 | (2006.01) |
| B29C 65/18 | (2006.01) |
| B29C 65/24 | (2006.01) |
| B29C 65/30 | (2006.01) |
| B29C 65/72 | (2006.01) |
| B29C 65/78 | (2006.01) |

(Continued)

(52) U.S. Cl.
CPC ............... *B32B 39/00* (2013.01); *B29C 65/008* (2013.01); *B29C 65/16* (2013.01); *B29C 65/1641* (2013.01); *B29C 65/1654* (2013.01); *B29C 65/18* (2013.01); *B29C 65/245* (2013.01); *B29C 65/30* (2013.01); *B29C 65/305* (2013.01); *B29C 65/72* (2013.01); *B29C 65/7852* (2013.01); *B29C 65/7891* (2013.01); *B29C 66/1122* (2013.01); *B29C 66/244* (2013.01); *B29C 66/344* (2013.01); *B29C 66/43* (2013.01); *B29C 66/81422* (2013.01); *B29C 65/1619* (2013.01); *B29C 65/1638* (2013.01); *B29C 66/71* (2013.01); *B29C 66/8181* (2013.01); *B29C 66/81811* (2013.01); *B29C 66/836* (2013.01); *B32B 37/065* (2013.01); *B32B 38/0004* (2013.01); *B32B 2310/0843* (2013.01); *B32B 2439/70* (2013.01)

(58) Field of Classification Search
CPC .. B29C 65/245; B29C 65/305; B29C 66/344; B29C 65/1619; B29C 65/7852; B29C 66/71; B29C 65/1654; B29C 66/1122; B29C 66/43; B29C 65/16; B29C 66/81422; B29C 66/244; B32B 37/065; B32B 2439/70; B32B 2310/0843; B32B 38/0004
USPC ........................................................ 156/379.6
See application file for complete search history.

(56) References Cited

U.S. PATENT DOCUMENTS 3,851,839 A * 12/1974 Hynes ....................... 242/147 R
3,989,778 A    11/1976 Osborne

(Continued)

*Primary Examiner* — Richard Crispino
*Assistant Examiner* — Elizabeth Royston
(74) *Attorney, Agent, or Firm* — Maginot, Moore & Beck, LLP (57) ABSTRACT

A web processing system for laser welding at least two continuous webs includes a supply station for supplying the webs and a lamination station for laser welding the webs together in a pre-determined pattern. The lamination station includes a platen having a platen surface between leading and trailing ends thereof across which the webs are conveyed and a laser welding apparatus offset from the platen surface and configured to direct a laser beam to said platen surface to laser weld the webs in the pre-determined pattern. In one aspect, the platen surface is arcuate so that the webs are maintained in intimate contact across the platen surface.

14 Claims, 4 Drawing Sheets

(51) Int. Cl.
*B29C 65/00* (2006.01)
*B32B 37/06* (2006.01)
*B32B 38/00* (2006.01)

(56) References Cited

U.S. PATENT DOCUMENTS

| | | | |
|---|---|---|---|
| 4,029,535 A | 6/1977 | Cannon et al. | |
| 4,133,712 A * | 1/1979 | Geschwender | 156/512 |
| 4,945,203 A | 7/1990 | Soodak et al. | |
| 4,976,811 A * | 12/1990 | Siebert | 156/66 |
| 4,978,118 A * | 12/1990 | Kasahara | 271/275 |
| 5,078,821 A | 1/1992 | Garvey et al. | |
| 5,204,505 A * | 4/1993 | Prange et al. | 219/121.63 |
| 5,500,503 A * | 3/1996 | Pernicka et al. | 219/121.64 |
| 6,822,844 B2 * | 11/2004 | Blim | 361/225 |
| 7,255,770 B2 | 8/2007 | Wissman | |
| 7,815,094 B2 * | 10/2010 | Sunahara et al. | 228/112.1 |
| 2004/0035524 A1 * | 2/2004 | Link | 156/272.8 |
| 2005/0076997 A1 * | 4/2005 | Brinkmann | 156/203 |
| 2010/0171240 A1 * | 7/2010 | Singh et al. | 264/482 |

* cited by examiner

METHOD AND APPARATUS FOR NON-CONTACT JOINING OF WEB FED MATERIALS

CROSS-REFERENCE TO RELATED APPLICATION

The present application claims priority to provisional application Ser. No. 61/444,197, filed on Feb. 18, 2011, the entire disclosure of which is incorporated herein by reference.

BACKGROUND

Non-contact joining or welding of plastic materials is well-known. In a typical system, two or more webs or films are conveyed over a platen and a focused laser beam is used to heat the web material to a temperature sufficient to join the multiple layers. In some cases, the weld or joint is continuous along the travel path of the web(s), such as for an edge seam. Welds or joints that are not collinear with the travel path of the web(s) require different considerations. For instance, transverse welds are usually formed by scanning the laser beam transversely across the webs at or immediately adjacent nip rollers used to hold the webs together.

The prior techniques for forming collinear and transverse welds, or for that matter welds that follow a more complex pattern, generally permit limited throughput. Moreover, the prior techniques are relatively inflexible, requiring significant changes to the process and equipment to generate different weld patterns. There is a need for a non-contact method for welding web fed materials in which the welds may be provided in a variety of patterns across a finished product. Particular examples of finished products include multi-pocket sheets such as used in photo albums, business card organizers, cd carriers, protective pages and the like.

Figure 1:
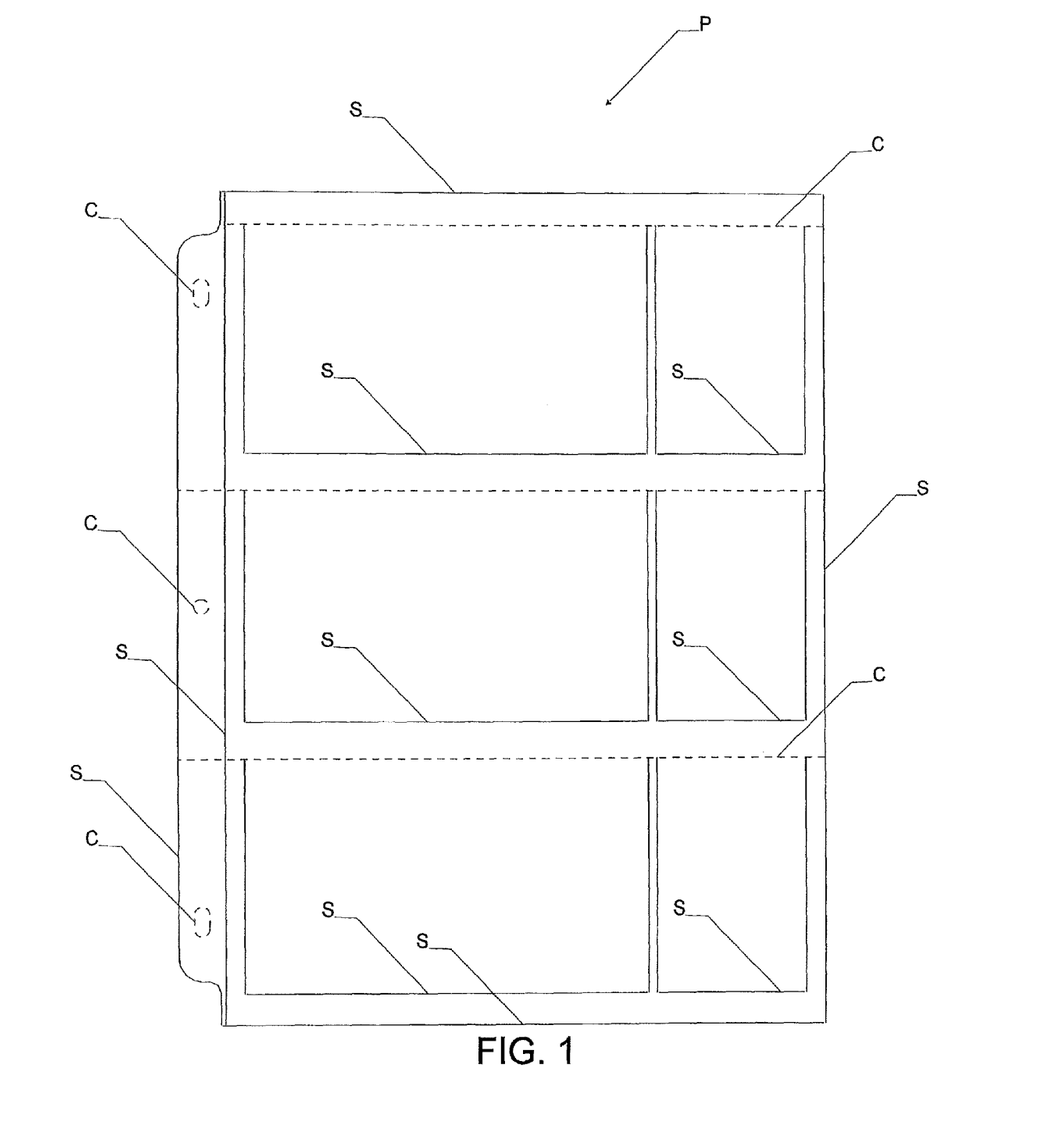
FIG. 1 is a plan view of a product formed using the methods and apparatuses disclosed herein.

One example of a product P is shown in FIG. 1. The product is formed by two or more webs or sheets of a film, such as a polypropylene or polyethylene film. The product P may include several cut-outs or cuts C to provide certain functional elements, such as pockets or mounting holes. The multiple sheets are joined or welded at several seams S which form the periphery of the product as well as the periphery of certain features of the product, such as pockets for holding pictures, cards, discs or the like. In the illustrated product, six uniformly sized pockets are provided. However, in other products, more pockets may be provided or pockets of different sizes and shapes may be included. It can be appreciated that the various product configurations can add complexity to the seams S that must be formed.

DETAILED DESCRIPTION

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

Figure 2:
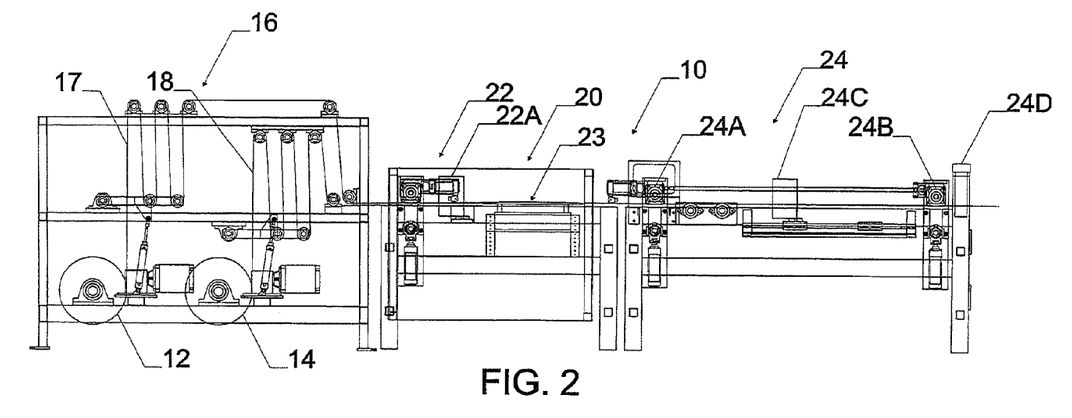
FIG. 2 is a side schematic view of a web product processing system for producing the product shown in FIG. 1.
Figure 3:
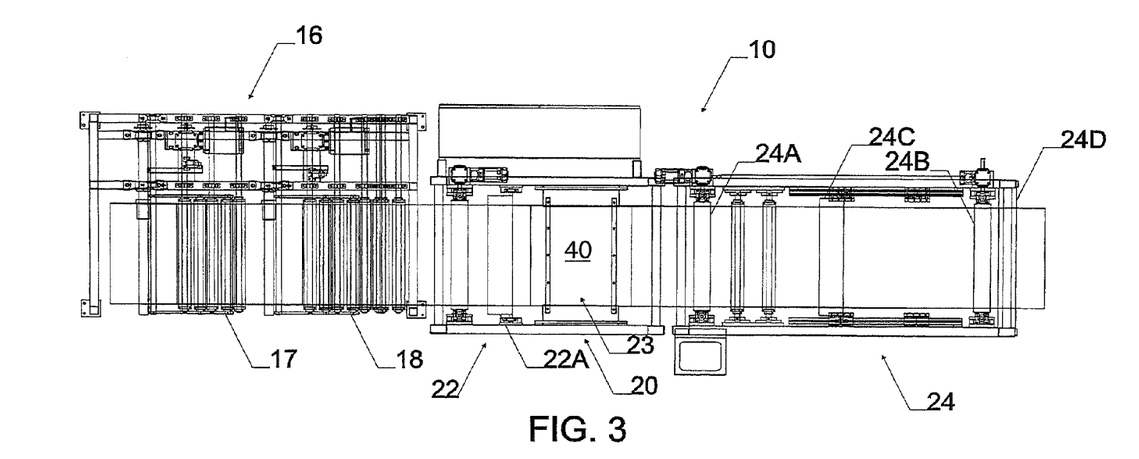
FIG. 3 is a top schematic view of the system shown in FIG. 2.

Referring to FIGS. 2-3, a web processing system 10 is shown. The system includes a pair of web rolls 12, 14 each supplying a web of a heat sealable material, such as polypropylene, polyethylene, polyester and the like. More particularly, the web material is susceptible to non-contact heat sealing using a laser. The webs are fed through a supply station 16 that includes a corresponding pair of take-up roller assemblies 17, 18 that maintain a pre-determined amount of tension in the webs as they are fed to downstream stations of the handling system 10. In the illustrated embodiment, two separate web rolls are depicted. However, the two webs fed from the supply station may be in the form of a single film that is folded over onto itself. In this instance, the supply station 16 may include a single web roll 12 and include a conventional sheet folding element (not shown) between the supply station 16 and the next downstream station.

In particular, the webs are fed from rolls 12, 14 to a lamination station 20 where the webs are welded according to the particular product being formed. The station 20 may include a pre-processing station 22 at which certain cuts may be made on one or both of the webs, such as with a slitter 22A. For instance, for the product P shown in FIG. 1, the pre-processing station may make certain of the cuts C used to form the pockets of the product. The webs are continuously fed to the welding station 23 where the welds or seams are formed.

The newly welded webs then advance to a post-processing station 24 that performs various operations on the webs to eventually discharge a finished product, such as product P. The web processing system 10 includes means for conveying the webs through the successive stations, either continuously or intermittently in coordination with the steps performed to create the final product P. For instance, the means for conveying may contemplate an array of nip rollers 24A, 24B in the post-processing station that are used to draw the webs from the rolls 12, 14 and through the successive stations. The take up assemblies 17, 18 of the web supply station 16 can be controlled to maintain a pre-determined tension in the webs being drawn from the web rolls 12, 14. The action of the web supply station 16 and post-processing station 24 are thus coordinated to pull the webs through the system 10 with the proper amount of tension. The stations also cooperate to properly register the webs at the welding station 23 so that the webs can be stationary while the weld patterns are formed. For instance, for a typical product, such as product P, the webs may dwell at the welding station 23 for three seconds or less while the welds or seams are formed. The operation of the three stations 16, 20 and 24 are coordinated so that the webs dwell at the welding station only for as long as necessary to fuse the webs in the weld pattern before advancing to the post-processing station. When a newly welded portion of the web is in the post-processing station, the next adjacent section of the web is situated at the welding station. So in the particular example, a newly formed product is generated every three seconds. The take-up assemblies 17, 18 and nip rollers 24A, 24B are exemplary of means for conveying the webs through the web processing system, it being understood that other mechanisms and devices may be employed that are capable of controlled flow of web material through the lamination station 20.

The post-processing station 24 may include components for performing additional cuts on the newly welded webs. For instance, the station may include a hole punch assembly 24C to form mounting holes at one edge of the product, such as shown in FIG. 1, or other cutting or slitting devices as desired. A guillotine cutter 24D at the end of the station maybe provided to cut the continuous web to form the individual sheet products P.

Figure 4:
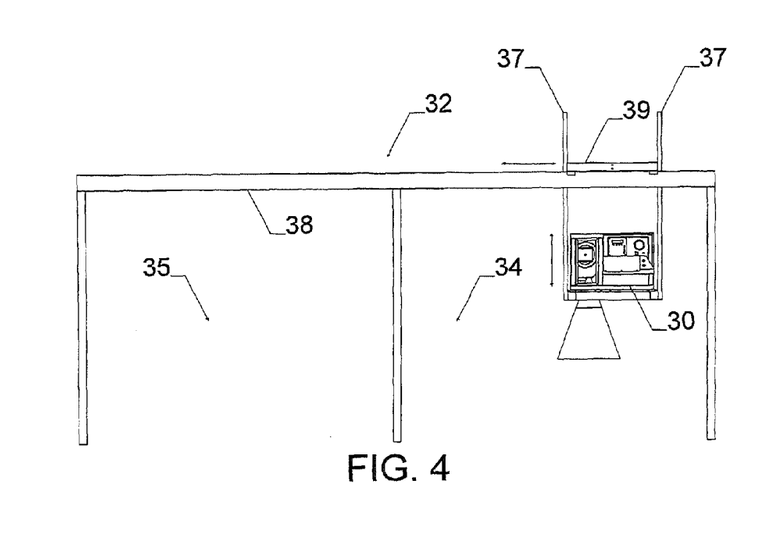
FIG. 4 is side view of a laser welding apparatus and gantry to integrate with the web product processing system shown in FIGS. 2-3.
Figure 5:
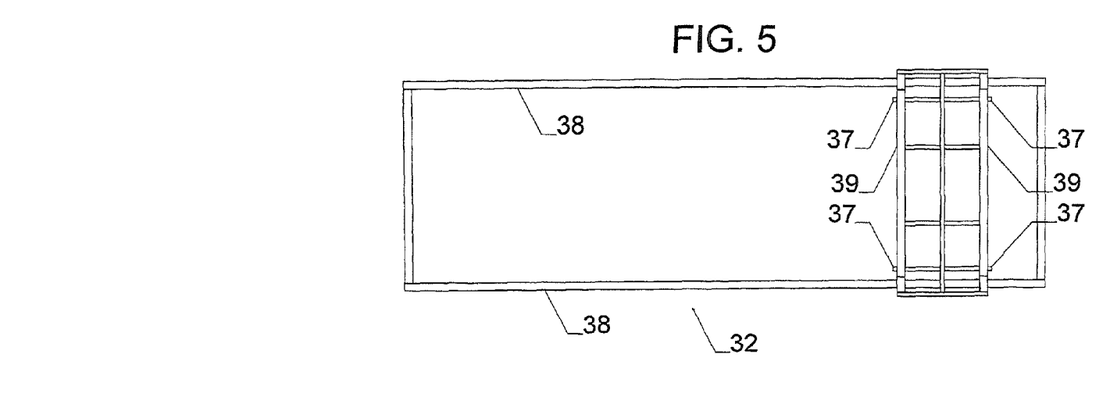
FIG. 5 is a top view of the apparatus and gantry shown in FIG. 4.
Figure 6:
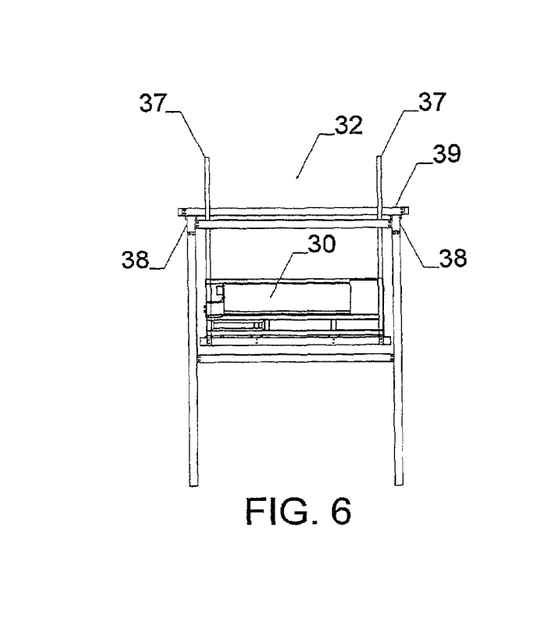
FIG. 6 is an end view of the apparatus and gantry shown in FIGS. 4-5.
Figure 7:
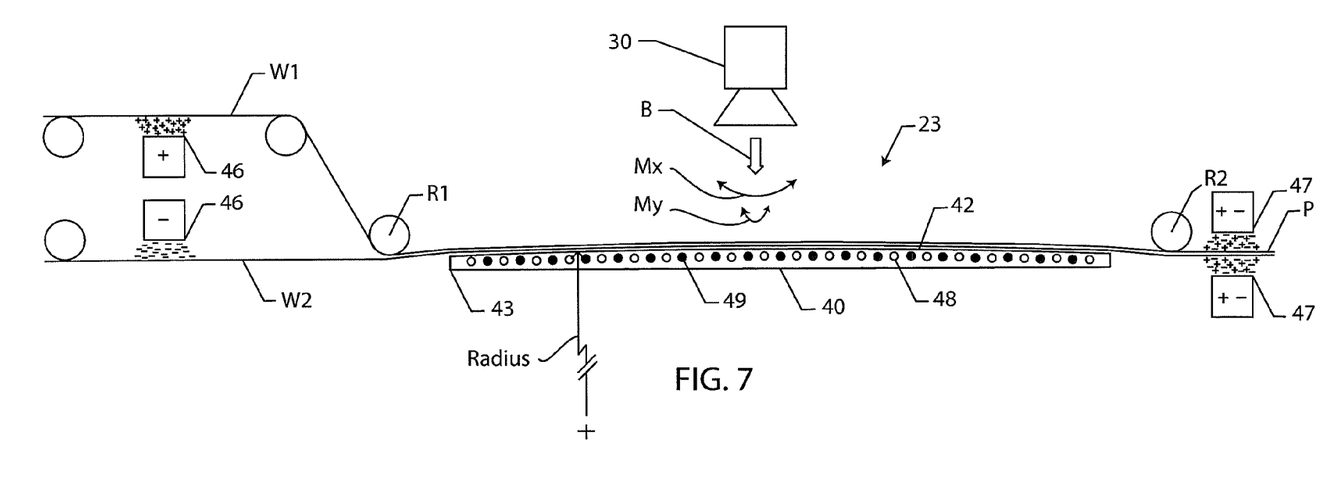
FIG. 7 is a side view of a platen used with the processing system and welding apparatus shown in FIGS. 1-6, according to one aspect of the present invention.

As thus far described, the web processing system 10 is of conventional construction for a variety of welding operations. The present invention contemplates laser welding for forming the weld pattern in a continuous web-fed product. Thus, as shown in FIGS. 4-6, a laser welding apparatus 30 is supported on a gantry 32 by a support frame 37. The gantry 32 is configured to overlap the lamination station 20 of the web processing system 10, and more particularly to operably position the laser welding apparatus 30 over the welding station 23, such as shown in FIG. 7. In one feature, the gantry 32 is divided into one or more bays 34, 35, with each bay configured to reside over a corresponding welding station of separate web processing lines. Thus, the gantry 32 may be selectively positioned over two adjacent lines, each including a separate web processing system 10. The gantry is provided with opposite transport rails 38 and the support frame 37 includes a transport slide 39 or similar structure that allows the frame to travel along the rails 38. The gantry and support frame are thus configured to move the laser welding apparatus 30 from one bay 34 to the other bay 35, with a dedicated web processing system 10, configured as depicted in FIGS. 2-3, situated within each bay. A drive mechanism (not shown) is provided on either the gantry 32 or the transport slide 39 to convey the transport slide between the bays 34, 35. The drive mechanism can be controlled by software associated with the laser welding apparatus. It is thus contemplated that the same welding apparatus 30 may be used to produce different products at different web processing systems. For instance, the web processing system within bay 34 may process product from polyurethane web material while the system within bay 35 may process product from polyester web material. The product produced in each bay may also incorporate different welded features. It is understood that multiple bays may be provided so that the same laser welding apparatus 30 may service more than two web processing lines.

The laser welding apparatus may incorporate a conventional laser, such as a $CO_2$ laser, and a controller capable of directing the laser beam in a pre-determined pattern. For instance, as shown in FIG. 7, the laser beam B emanating from the apparatus 30 can be moved along multiple axes so that the beam can trace out a path across the entire surface of the web passing through the welding station 23. One suitable laser welding apparatus uses an array of servo-motor or micro-motor driven mirrors to direct the beam B, such as by moving the beam along the x-axis (Mx) and y-axis (My). The motor-driven mirrors are adapted to manipulate the beam B within a particular field size that encompasses the dimensions of the final product. The apparatus 30 may further incorporate a controllable motor to move the laser welding apparatus 30 in the z axis to adjust the field size. Thus, in a specific example, the laser can generate a beam having a focused diameter of 0.12 mm and a field size ranging from 200 mm×200 mm to 600 mm×600 mm achieved by adjusting the z-axis height of the laser above the web in the range of 300-600 mm. The power of the laser may be adjustable depending upon the nature of web material being joined. In a specific example, the laser is a $CO_2$ laser with a maximum power output of 400 watts at a beam wavelength of about 10.6 µm. The laser beam may be adjusted to solidly weld plastic webs in thicknesses ranging from 20.0 microns to about 500 microns. The beam diameter (i.e., focus) and laser power may be adjusted to achieve weld or seam widths of 0.3-5.0 mm. Moreover, the laser may be adapted for field sizes ranging from 2 mm×2 mm to 600 mm×600 mm.

The motors charged with moving the mirrors to steer the laser beam B are preferably computer controlled. In one embodiment, the motors are controlled by software that translates a vector file into beam movements. The vector file is generated to represent the desired weld pattern within the laser field—i.e., within the perimeter of the finished product. The travel speed of the laser may also be adjusted while ensuring sufficient energy transfer to the webs to melt the web material as the beam travels. In one specific embodiment, the laser is capable of a beam travel speed of about 1000 mm/sec. At this travel speed, many weld patterns on a standard letter-size sheet (8½%×11 in.) product can be accomplished in under 0.3 seconds.

The webs to be joined, W1, W2, are fed through the welding station 23 across a platen 40, as shown in FIG. 7. In one feature, the laser welding apparatus may be configured to utilize the reflectivity of the platen surface underneath the webs to be joined. In this feature, the laser beam B is unfocused when it initially strikes the upper web W1 but has a focal point that is beneath or beyond the webs. The beam focal point is calibrated so that the laser beam becomes focused on the webs W1, W2 when it is reflected off the platen surface 42. In this embodiment, the platen 40 incorporates a highly polished surface to maximize reflectivity of the laser beam without appreciable loss in beam power. In certain embodiments, the platen may be formed of a highly polished stainless steel or mirrored aluminum. The beam focal point may be adjusted based on the thickness of the webs. Moreover, the beam width at the focal point may be adjusted to control the dimensions and nature of the laser weld between the continuous webs.

In another aspect, the platen surface 42 may be configured to reduce reflection and in some cases absorb the laser radiation. In some embodiments the platen surface may incorporate an absorptive coating, such as a flat black oxide, configured to absorb the laser or certain wavelengths. In other embodiments, the platen surface or may include a coating or be modified by a surface treatment, for example to form a brushed metal surface, in which the surface is configured to provide controlled reflectivity or a combination of reflection and absorption. The platen surface may thus be tailored to maximize the quality of the laser weld and the welding process, such as to reduce weld times and decrease laser power requirements.

An essential aspect of the non-contact welding system disclosed herein is that the separate webs are maintained in intimate contact at the welding station 23, but without the use of a separate device bearing on or contacting the webs. In some prior art welding systems, the webs are compressed between heated bars to form the weld. In certain prior art laser welding systems, the laser beam is directed at the nip between opposing nip rollers, with the rollers compressing the webs together. Thus, in these prior systems, the intimate contact is achieved by applying direct pressure to the webs. This approach inherently reduces the process speed capabilities of the system and limits the flexibility in weld patterns that can be achieved with these systems. The present invention contemplates a non-contact weld system using the laser welding apparatus 30 in which the two or more continuous webs are maintained in intimate contact throughout the entire field size of the laser. In other words, in the specific examples above, two webs W1 and W2 (fed from the respective web rolls 12 and 14) are maintained in intimate contact in all directions (x and y) within the 600 mm×600 mm field dimension for the exemplary laser welding apparatus.

In one embodiment, this non-contact intimate contact between webs W1, W2 is achieved by drawing the two webs across a welding platen 40 having an arcuate surface 42, as shown in FIG. 7. Elements R1, R2 may be provided at the leading and trailing ends of the platen 40 with the elements offset below the level of the surface 42 at the ends. More particularly, the elements R1, R2 are arranged below a line tangent to the arcuate surface at the respective ends 43, 44 of the platen. This position of the elements R1, R2 keeps the webs flush with the arcuate surface 42. In a preferred embodiment the elements R1, R2 are conventional rollers. It can be appreciated that gaps between the webs and the platen surface are depicted in FIG. 7 for clarity purposes only. In operation the webs are in flush contact with each other and with the surface 42.

The arcuate surface 42 is defined at a curvature that maintains the webs W1, W2 in intimate contact across the entire platen 40 without disturbing the movement of the webs and the finished product P across the platen to the post-processing station 24. In one specific embodiment, the arcuate surface 42 is defined at a radius of about 2285 mm (90 in) so that the leading and trailing ends 43, 44 are about at least 1.0 mm (0.04 in) below the center or apex of the platen for a 214 mm (8½ in.) platen length. In one specific embodiment the ends 43, 44 are about 2.5 mm (0.1 in.) below the center of the platen. It has been found that this curvature maintains the two webs in intimate contact throughout the entire laser welding field. Other curvatures are contemplated as well as adjustments of the curvature based on the length of the platen. For instance, a shorter platen may require a smaller radius of curvature for the arcuate surface 42 and/or require that the leading and trailing ends may be different distance below the center of the platen. Similarly, a longer platen may require a larger radius of curvature and/or a different end offset. It is desirable that the height difference from the middle of the platen to the leading and trailing ends not be too great as to create inconsistencies in the application of the laser beam to the webs. Any change of the distance between the laser welding apparatus 30 and the webs to be welded can require adjustment of the laser beam to ensure a proper laser weld seam. In many instances the laser beam is controlled by software that can be programmed to account for the difference is of the z-direction component from one end of the platen to the other.

The arcuate platen surface 42 in combination with the elements R1, R2 maintain the webs in intimate contact. The web processing system incorporates features to maintain the webs in a pre-determined tension when the webs are stationary or moving. Thus, the system may incorporate servo controlled rollers in the supply station 12 and/or the post-processing station to control the tension of the webs as they are directed to the lamination station. Likewise, the leading and trailing elements/rollers R1, R2 may also be servo controlled to maintain a pre-determined tension of the webs across the platen 40. In some cases, providing vacuum in the platen can assist in maintaining intimate contact between the webs. In this instance, the platen 40 may be provided with an array of holes in the platen surface 42 that are connected to a vacuum source.

In the illustrated embodiment, the platen 40 and the arcuate surface 42 are fixed, meaning that the webs W2, W2 move across a stationary surface. In an alternative embodiment, the platen may be provided with a belt or other moving surface that moves with the webs as they traverse the platen 40. In this embodiment, the moving surface may move only between welding cycles. Alternatively, the surface may move with the webs during the weld cycle, with appropriate modifications to the software controlling the laser beam B, namely that the beam weld pattern follows the movement of the web.

In another aspect, the intimate contact may be provided or augmented by the use of static attraction between the webs. Many plastic web materials exhibit a self-affinity due to static electrical charge, meaning that separate webs or sheets may "stick together". In the web supply station 16, this attribute of the web materials can be troublesome, especially when the separate webs are being drawn together for entry into the lamination station 20. Thus, the web processing system will typically include a de-ionizing bar (not shown) near the web rolls 12, 14 (see FIG. 2) to neutralize the webs and prevent the self-affinity. However, when intimate contact is desired, such as at the welding station 23, this self-affinity can be desirable. Thus, in this alternative embodiment, one or more ionizing bars 46 may be incorporated near the upstream roller R1 at the leading end of the platen 40, or between the supply station and lamination station 23 as shown in FIG. 7. In some instances the ionizing feature may be incorporated into the upstream roller. The ionizing bar thus imparts a static electrical charge to the uppermost web W1, which causes a static attraction between the two webs W1, W2. As shown in FIG. 7, two ionizing bars 46 may be provided—one to apply a positive charge to the web W1 and the other to apply a negative charge to web W2. This static attraction is maintained throughout the welding process and may be removed by one or more de-ionizing bars 47 adjacent to or incorporated in the downstream roller R2. It can be appreciated that this self-affinity feature may be used on a flat platen, rather than with the arcuate surface 42 shown in FIG. 7. In one specific embodiment the ionizing bar may be part of a static generator system, such as the static generator and charging bar Model 7302 sold by TAKK Industries, Inc. of Cincinnati, Ohio.

As is known, when the laser beam B is directed to the webs W1, W2, the webs absorb the light energy and the plastic material beneath the beam liquefies. As explained above, the beam diameter is selected to minimize the weld or seam width, or to minimize the amount of material that is melted, while ensuring a solid weld between the webs. However, even with an optimized weld width, the web material still has a tendency to flow outward from the beam focus. It is therefore desirable to cool the web material below its liquidus temperature as quickly as possible, particularly since the welded product P is immediately conveyed to the post-processing station 24 once the last weld has been made. In one embodiment, maintaining a chilled ambient temperature can hasten the cooling process. In another embodiment, cold air may be directed onto the downstream portion of the platen 40. In this embodiment, a blower may be incorporated into the lamination station or into the gantry 32 with the laser welding apparatus 30.

In another feature, the platen 40 may incorporate a cooling feature. In one embodiment, the platen may be provided with a piping system 48 coupled to a source of coolant and embedded just below the platen surface 42 to circulate cooling fluid sufficient to lower the temperature of the surface, as illustrated in FIG. 7. It is contemplated that the piping system 48 extends across at least the entire field of the laser welding apparatus, or across the entire platen as shown in the figure. The cooling capability of the piping system is controlled by the flow of a coolant through all or selected portions of the piping system. In one process, the entire welded product P may be cooled at once by directing coolant through the entire piping system, either prior to or during advancement of the product to the post-processing station. In another process, coolant can be directed through specific portions of the piping system in coordination with the welding process. In other words, once a portion of the web field has been welded by the laser welding apparatus coolant can be immediately directed through the piping system beneath that portion of the web field. As the laser 30 welds successive portions of the two webs the associated portions of the piping system can be "activated" with coolant. With this approach the molten material of the welded webs can begin cooling immediately after the weld is formed and before the welded product is advanced to the next station. The flow of coolant through the piping system can thus be controlled by the software controlling the movement of the laser welding apparatus 30.

In a further embodiment, a separate cooling plate incorporating the piping system 48 may be provided downstream of the platen 40, prior to the post-processing station 24. Likewise, the trailing roller R2 may incorporate a cooling feature. Alternatively, or in addition, a blower can be aimed at the platen to blow chilled air or other gas onto the newly welded webs. The cooling features described herein are configured to cool the molten welded web material sufficiently for the welded product to be conveyed to the next station of the web processing system without compromising the welds.

In another aspect, the platen 40 may incorporate a heating system or heating elements 49 for heating the surface 42 of the platen, as shown in FIG. 7. For some materials and products, heating the lower web W2 can allow the lower web to become molten more quickly and in unison with the upper web W1 that is being directly heated by the laser beam. This coordinated heating leads to a better weld joint between the two webs and can speed up the laser welding process. Thus, in one embodiment the elements 49 may include a conductive mesh or coil array that is embedded within the platen near enough to the surface 42 to heat the surface. The mesh is coupled to a source of electrical energy and may be activated and deactivated through a controller (not shown) and may be integrated into the laser welding software to coordinate the activation of the element 49 with the laser welding operation.

The heating elements may span the entire platen, span a limited length of the platen, such as the field of the laser welding apparatus, or be provided in discrete separately controllable mesh segments. Moreover, the elements 49 may be integrated with the cooling system 48 within the platen, as depicted in FIG. 7, with the heating and cooling operation coordinated to optimize the weld and welding time. The elements 49 may be adapted or controlled to heat only the web W2 in direct contact with the platen surface, or may be configured to heat the platen surface enough to heat both webs to a predetermined temperature.

In some products it is desirable to incorporate features in one web but not in the other. For instance, a design may be applied to the upper web W1 and then the two webs can be joined as described above. In this instance, a two stage process may occur in the lamination station 20, in which the first stage uses the laser welding apparatus 30 to create a feature on the upper web W1 and then the same laser is used to weld the webs W1, W2 together in the second stage. It is desirable to provide support for the web throughout both stages. Thus, in one embodiment, the platen may be modified to permit introduction of the second web W2 downstream of the first web W1.

Figure 8:
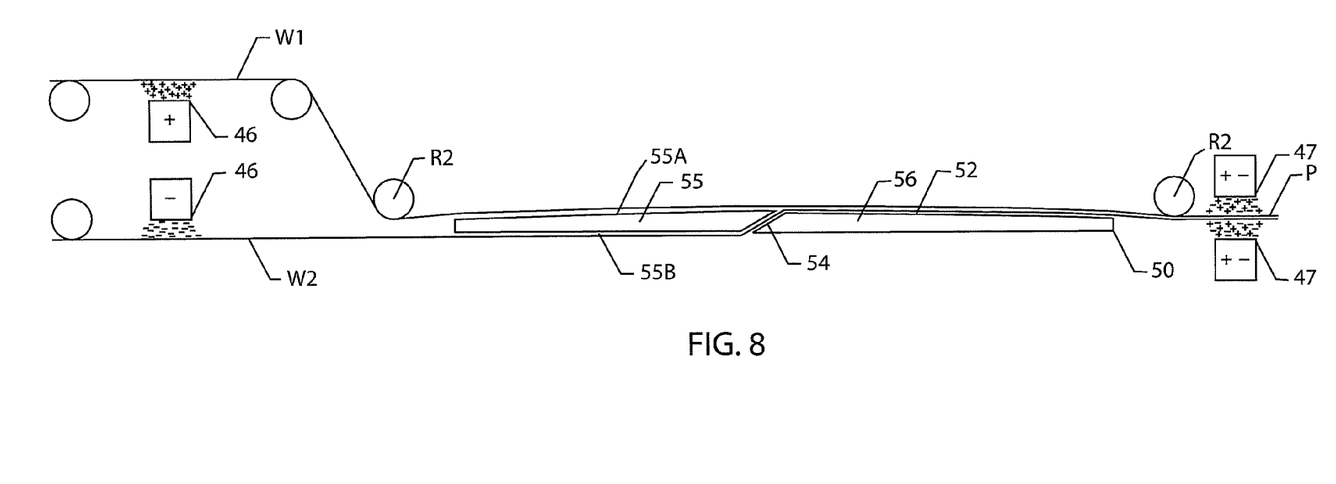
FIG. 8 is a side view of a modified platen according to another aspect of the present invention.

As shown in FIG. 8, a platen 50 may include an upstream portion 55 and a downstream portion 56 separated by a channel 54. The channel 54 provides a path for introducing the lower web W2 beneath the upper web W1. The upper web is directed across the upper surface 55A of the upstream portion 55 to the arcuate surface 52 of the platen 50 by the roller R1, as described above. A roller R2 may be provided at the trailing end of the platen to maintain the webs in intimate contact, as described above. The lower web W2 is directed across the bottom surface 55B of the upstream portion and into the channel 54.

The laser assembly 30 may be programmed to create a weld pattern in the continuous webs W1, W2 at the downstream portion 56 and a different pattern in the upper web W1 only at the upstream portion 55 in the same weld cycle. Upon completion of that weld cycle, the two webs are advanced so that the portion of the upper web W1 with the newly formed pattern is in intimate contact with the lower web W2 at the downstream portion 56 for welding in a subsequent weld cycle. The location of the channel 54 may be different between platens depending upon the desired weld patterns in different parts of the final product. It is further contemplated that the location of the different weld patterns can be adjusted using a single platen having a fixed channel location by moving the laser field relative to the platen. In other words, shifting the laser welding field upstream in effect moves the channel toward the downstream end of the final product. With this approach the platen 50 should have sufficient length to accommodate shifting the welding field in both the upstream and downstream directions as required to achieve the desired weld patterns.

The web processing system of the present invention provides an efficient and easily configurable system and method for non-contact joining of plastic web or film to form a final product. The invention permits the use of a laser to rapidly create a weld pattern or design on continuously fed webs. Variations of the laser performance characteristics may be readily changed, essentially on the fly, to modify the weld pattern as desired, without the need to change any tooling, fixtures or any aspect of the web handling system. The present invention also allows the laser welding process to occur as the webs are moving, without risking separation of webs during the weld cycle.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A web processing system for processing continuous webs of heat sealable material, comprising:
   a supply station for supplying at least a first and a second continuous web;
   a lamination station for laser welding at least said first and second continuous webs together in a pre-determined pattern; and
   means for conveying said continuous webs from said supply station through said lamination station,
   wherein said lamination station includes;
   a platen having a platen surface between leading and trailing ends thereof across which at least said first and second continuous webs are conveyed, said platen including an upstream portion adjacent said leading end of said platen and a downstream portion separated by a channel, said downstream portion including said platen surface and said upstream portion having an upper surface adjacent said platen surface and an opposite lower surface, wherein said first continuous web is conveyed across said upper surface and said second continuous web is conveyed across said opposite surface, and further wherein said channel is sized and configured for passage of said second continuous web therethrough to a position between said first continuous web and said platen surface; and a laser welding apparatus configured to direct a laser beam to said platen surface to laser weld at least said first and second continuous webs together in said pre-determined pattern.

2. The web processing system of claim 1, wherein said laser welding apparatus is configured to direct said laser beam only to said platen surface.

3. The web processing system of claim 1
wherein said platen includes:
an arcuate platen surface defining a continuously curved surface between said leading and trailing ends thereof across which at least said first and second continuous webs are conveyed; and
at least one leading end element at said leading end of said platen and at least one trailing end element at said trailing end of said platen, said leading and trailing end elements configured and arranged relative to said platen surface to maintain at least said first and second web in intimate contact across said platen surface.

4. The web processing system of claim 3, wherein said leading and trailing end elements are configured and arranged to direct at least said first and second webs below a line tangent to said platen surface at the corresponding leading and trailing end of said platen.

5. The web processing system of claim 3, wherein said leading and trailing end elements are rollers.

6. The web processing system of claim 3, wherein said arcuate platen surface is defined at a radius of curvature sized relative to the length of said platen surface from said leading to said trailing end such that said leading and trailing end are at least about 1.0 mm (0.04 in.) below the center of said platen surface.

7. The web processing system for processing continuous webs of heat sealable material of claim 3, further comprising:
an ionizing element at said leading end of said platen configured to create a self-affinity in at least said first and second continuous webs; and
a de-ionizing element at said trailing end of said platen configured to remove the self-affinity of said continuous webs.

8. The web processing system for processing continuous webs of heat sealable material of claim 3, further comprising a cooling system configured to cool at least said first and second continuous webs after being laser welded.

9. The web processing system of claim 8, wherein said cooling system is embedded within said platen.

10. The web processing system of claim 9, wherein said cooling system includes a piping system embedded within said platen and connected to a source of coolant for flowing coolant therethrough.

11. The web processing system of claim 10, wherein:
said laser welding apparatus is configured to apply the laser beam in a predetermined field across said platen; and
said piping system is configured to span said field to cool said platen within said field to thereby cool said continuous webs.

12. The web processing system for processing continuous webs of heat sealable material of claim 3, further comprising:
a heating system configured to heat at least the one of said first and second continuous webs in direct contact with said platen surface before being laser welded, wherein said heating system includes a wire mesh or coil array embedded within said platen and connected to a source of electrical energy for energizing said heating system.

13. The web processing system of claim 12, wherein:
said laser welding apparatus is configured to apply the laser beam in a predetermined field across said platen; and
said heating system is configured to span said field to heat said platen within said field to thereby heat said continuous webs.

14. The web processing system of claim 3 wherein said platen surface is formed of a highly reflective material adapted to reflect said laser beam from said surface to said first and second continuous webs.

\* \* \* \* \*